United States Patent

Yoshikawa et al.

Patent Number: 5,816,215
Date of Patent: Oct. 6, 1998

[54] CYLINDER HEAD FOR AN IN-CYLINDER INJECTION SPARK-IGNITION TYPE INTERNAL COMBUSTION ENGINE

[75] Inventors: Satoshi Yoshikawa, Otsu; Kazuhiro Geshi, Nagaokakyo; Takashi Kawabe, Funai-gun; Katsunori Ueda, Kyoto; Nobuaki Murakami, Kyoto; Hirokazu Komai, Kyoto, all of Japan

[73] Assignee: Mitsubishi Jidosha Kogyo Kabushiki Kaisha, Tokyo, Japan

[21] Appl. No.: 790,890

[22] Filed: Jan. 29, 1997

[30] Foreign Application Priority Data

Jan. 30, 1996 [JP] Japan ................................ 8-014638

[51] Int. Cl.$^6$ .......................... F02B 3/02; F02M 65/00; G01M 15/00

[52] U.S. Cl. .................. 123/301; 123/302; 123/305; 73/46; 73/49.7; 73/119 A

[58] Field of Search ...................... 123/305, 302, 123/294, 298, 301; 73/46, 47, 119 A, 49.7

[56] References Cited

U.S. PATENT DOCUMENTS

| | | |
|---|---|---|
| 5,195,362 | 3/1993 | Eason ........................................ 73/49.7 |
| 5,305,720 | 4/1994 | Ando et al. ............................. 123/193.4 |
| 5,335,635 | 8/1994 | Kadoi et al. ............................. 123/305 |

FOREIGN PATENT DOCUMENTS

| | | | |
|---|---|---|---|
| 177017 | 11/1949 | Austria ................................... 123/302 |
| 7102976A | 4/1995 | Japan . | |
| 217310 | 2/1942 | Switzerland ............................ 123/298 |
| 218141 | 7/1924 | United Kingdom .................... 123/294 |

*Primary Examiner*—Andrew M. Dolinar

[57] ABSTRACT

A cylinder head for an in-cylinder injection spark-ignition type internal combustion engine is formed with an injection passage for providing communication between a fuel injection valve and a combustion chamber. The injection passage includes a first and second passage sections disposed on the fuel injection valve side and on the combustion chamber side. The first passage section is formed, for example, into a truncated cone shape or a right circular cylindrical shape so that the cross sectional area decreases toward the fuel injection valve side or the area is constant over its entire length. The second passage section is formed to have the cross sectional area which increases toward the combustion chamber side. The fuel injected from the fuel injection valve flows into the combustion chamber via the injection passage having a gradually increasing cross sectional area, so that turbulence of fuel spray due to sudden divergent flow does not occur, resulting in an improved fuel combustion efficiency. Also, a seal seating face is formed on the inner face of the first passage section. By using a seal jig having a shape complementary to the seal seating face, a pressure leak test of cylinder head and a fuel leak test of fuel system can be achieved reliably and easily.

10 Claims, 8 Drawing Sheets

CYLINDER HEAD FOR AN IN-CYLINDER INJECTION SPARK-IGNITION TYPE INTERNAL COMBUSTION ENGINE

BACKGROUND OF THE INVENTION

1. Field of the Invention

The present invention relates to a cylinder head for an in-cylinder injection spark-ignition type internal combustion engine mounted on an automobile etc. and, more particularly, to a cylinder head which prevents the turbulence of fuel spray.

2. Description of Related Arts

In an in-cylinder injection spark-ignition type internal combustion engine mounted on an automobile etc., a mixture supplied to the internal combustion engine is made lean to the utmost while considering the operating state of the internal combustion engine from the view points of reducing noxious exhaust gas and improving the fuel efficiency or the like. However, there is a limit in making the mixture lean in a conventional manifold-injection type internal combustion engine (hereinafter, referred to as a manifold-injection gasoline engine). For example, if the mixture is too lean, the stability in engine operation is hindered. To obviate this, various types of in-cylinder injection type internal combustion engines (hereinafter, referred to as in-cylinder injection gasoline engines) adapted to directly inject fuel into combustion chambers have been proposed. In the in-cylinder injection gasoline engine, as disclosed in Unexamined Japanese Patent Publication No.7-102976, fuel is injected from a fuel injection valve into a cavity etc. provided on the top of the piston, whereby a mixture with an air-fuel ratio approximately equal to the stoichiometric air-fuel ratio is generated around the ignition plug at the ignition timing. Thereupon, the ignition can be effected even with a lean mixture as a whole, so that the discharge amount of CO and HC can be reduced while stable engine operation is maintained, and the fuel efficiency at the time of idling operation or low-load running operation of the engine can be greatly enhanced. Further, the in-cylinder injection gasoline engine has an excellent acceleration/deceleration response since the fuel injection amount can be increased or decreased without fuel transportation delay in the intake manifold.

However, the above-described in-cylinder injection gasoline engine presents problems in that the fuel spray form is deteriorated by the installation of fuel injection valve on the cylinder head, that a pressure leak test of cylinder head is required, and that it is difficult to test a fuel system for leaks upon assembling of the engine. The following is a description of these problems.

Generally, in the conventional in-cylinder injection gasoline engines, as shown in FIG. 8, a fuel injection valve 4 is installed in a cylinder head 2' so that an injection port 50 thereof faces a combustion chamber 5. The cylinder head 2' is formed with an injection valve mounting hole 80' in which the fuel injection valve 4 is mounted. Fuel spray 51 injected from the injection port 50 of the fuel injection valve 4 flows into the combustion chamber 5 through a portion of the injection valve mounting hole 80' on the downstream side with respect to the injection port 50. The length of the downstream portion of the injection valve mounting hole 80' is short (the length of the hole 80' just above the inner peripheral surface of a cylinder 6 is zero), and the cross sectional area thereof is also very small as compared with that of the combustion chamber 5. In other words, the cross sectional area of the passage of fuel spray 51 suddenly increases at a just downstream position of the injection port 50. As a result, the turbulence of fuel spray 51 (deterioration in fuel spray form) is produced by a sudden divergent flow (separated flow), so that incomplete combustion of fuel or the like is liable to occur, causing an increase in emission of noxious exhaust gas components, decrease in fuel efficiency, and so on. FIG. 8 does not specifically show the turbulence of fuel spray 51 caused by sudden divergent flow.

Also, in some in-cylinder injection gasoline engines, a reverse tumble flow 52 is produced in the combustion chamber 5 by supplying intake air from an upright intake port 13, which is open to the bottom face of the cylinder head at a position offset in the radial direction from the center of the cylinder head 2', into the combustion chamber to improve the combustion efficiency. However, when the fuel spray form is deteriorated, the gas flow in the cylinder such as the reverse tumble flow 52 is hindered, so that problems of decrease in fuel efficiency and the like sometimes occur.

If a minute crack or shrinkage cavity exists on the inner face of the cylinder head 2' in the in-cylinder injection gasoline engine, especially around the injection valve mounting hole 80' formed in the cylinder head 2', the high-pressure gas in the combustion chamber 5 acts on the minute crack or shrinkage cavity, presenting problems of impaired durability of cylinder head 2' and the like. To examine the presence of the minute crack or shrinkage cavity, therefore, a pressure leak test of cylinder head 2' is required. In order to make the pressure leak test, the opening of the injection valve mounting hole 80' on the cylinder head bottom face side must be sealed. However, it is difficult to completely seal the opening of the hole 80' for the conventional cylinder head 2', so that the reliability of pressure leak test is low.

Also, in the in-cylinder injection gasoline engine, since the fuel pressure is set far higher than that for the manifold-injection gasoline engine, fuel is liable to leak from the fuel system. Therefore, a leak test of fuel system upon assemblage of the engine is indispensable in addition to a check for fuel leak of the fuel injection valve 4 alone. In order to test this fuel leak, the injection port 50 of the fuel injection valve 4 installed in the cylinder head 2' must be sealed. However, it is difficult to completely seal the injection port 50 for the conventional cylinder head, so that the reliability of fuel leak test is low.

SUMMARY OF THE INVENTION

An object of the present invention is to provide a cylinder head for an in-cylinder injection spark-ignition type internal combustion engine, which prevents turbulence of fuel spray due to sudden divergent flow, thereby making it possible to improve the exhaust gas characteristics and fuel efficiency characteristics of the engine.

Another object of the present invention is to provide a cylinder head for an in-cylinder injection spark-ignition type internal combustion engine, which makes the pressure leak test of cylinder head and the leak test of fuel system easy and the reliability higher.

Still another object of the present invention is to provide a cylinder head for an in-cylinder injection spark-ignition type internal combustion engine, which achieves both of the prevention of turbulence of fuel spray due to sudden divergent flow and the easiness of the pressure leak test of cylinder head and the leak test of fuel system and the improvement in reliability.

According to the present invention, a cylinder head for an in-cylinder injection spark-ignition type internal combustion engine is provided. The internal combustion engine includes a combustion chamber defined by the inner surface of a cylinder, the top face of a piston slidably disposed in the cylinder, and the bottom face of the cylinder head, and includes a fuel injection valve disposed in the cylinder head for directly injecting fuel into the combustion chamber and an ignition device for igniting the fuel injected into the combustion chamber. The cylinder head is formed with an injection valve mounting hole to which the fuel injection valve is mounted, and an injection passage which communicates, at its first end disposed on the fuel injection valve side, with the injection valve mounting hole and which opens, at its second end disposed on the combustion chamber side, to the bottom face of the cylinder head. The cross sectional area of the injection passage on the first end side is equal to or larger than the cross sectional area of the injection valve mounting hole at the portion adjacent to the injection passage. The cross sectional area of the injection passage on the second end side is larger than its cross sectional area on the first end side.

The advantage of the cylinder head of the present invention is that since the injection passage, whose cross sectional area on the fuel injection valve side is equal to or larger than the cross sectional area of the injection valve mounting hole and whose cross sectional area on the combustion chamber side is larger than the cross sectional area on the fuel injection valve side, is provided between the injection port of the fuel injection valve and the combustion chamber, turbulence of fuel spray due to sudden divergent flow can be prevented, so that an increase in emission of noxious exhaust gas components, a decrease in fuel efficiency, etc. caused by the turbulence of fuel spray can be prevented.

Preferably, the injection passage is formed to have the cross sectional area which increases from the first end side toward the second end side. Alternatively, the injection passage is formed so that the change rate of its cross sectional area on the first end side is smaller than that on the second end side. The advantage of these preferred embodiments is that by more properly increasing the cross sectional area of the injection passage from the injection passage end on the fuel injection valve side toward the injection passage end on the combustion chamber side, the fuel spray form can be made properly, so that the exhaust gas characteristics and fuel efficiency characteristics of the internal combustion engine can be improved.

Preferably, the injection passage has its inner face formed with a seal seating face, on the first end side. More preferably, the seal seating face is formed into a tapered shape.

The advantage of these preferred embodiments is that the seal seating face with which a seal jig comes in close contact in the pressure leak test of cylinder head and the fuel leak test of fuel system can be provided. Specifically, by placing a seal jig into close contact with the seal seating face, the injection passage, and in turn the opening of injection valve mounting hole on the injection passage side can be sealed, so that a proper pressure leak test can be made reliably and easily. Also, the injection port can be sealed by placing a seal jig for fuel leak test into close contact with the injection port of fuel injection valve and the seal seating face, so that a proper fuel leak test can be made reliably and easily. According to the cylinder head of a preferred embodiment of a type having a tapered seal seating face, the pressure leak in cylinder head and the fuel leak in fuel system can be tested more properly.

Preferably, the cylinder head is provided with an upright intake port having an intake opening on the bottom face of the cylinder head at a position on one side with respect to an imaginary plane in which the axis of the cylinder is included. The second end of the injection passage is open to the bottom face of the cylinder head at a position adjacent to the intake opening end of the intake port.

The advantage of this preferred embodiment is that a reverse tumble flow of intake air (mixture) can be produced properly in the combustion chamber, so that the fuel combustion efficiency and in turn the fuel efficiency can be improved.

DETAILED DESCRIPTION OF THE PREFERRED EMBODIMENTS

An in-cylinder injection gasoline engine having a cylinder head according to one embodiment of the present invention will be described in detail with reference to the drawings.

Figure 1:
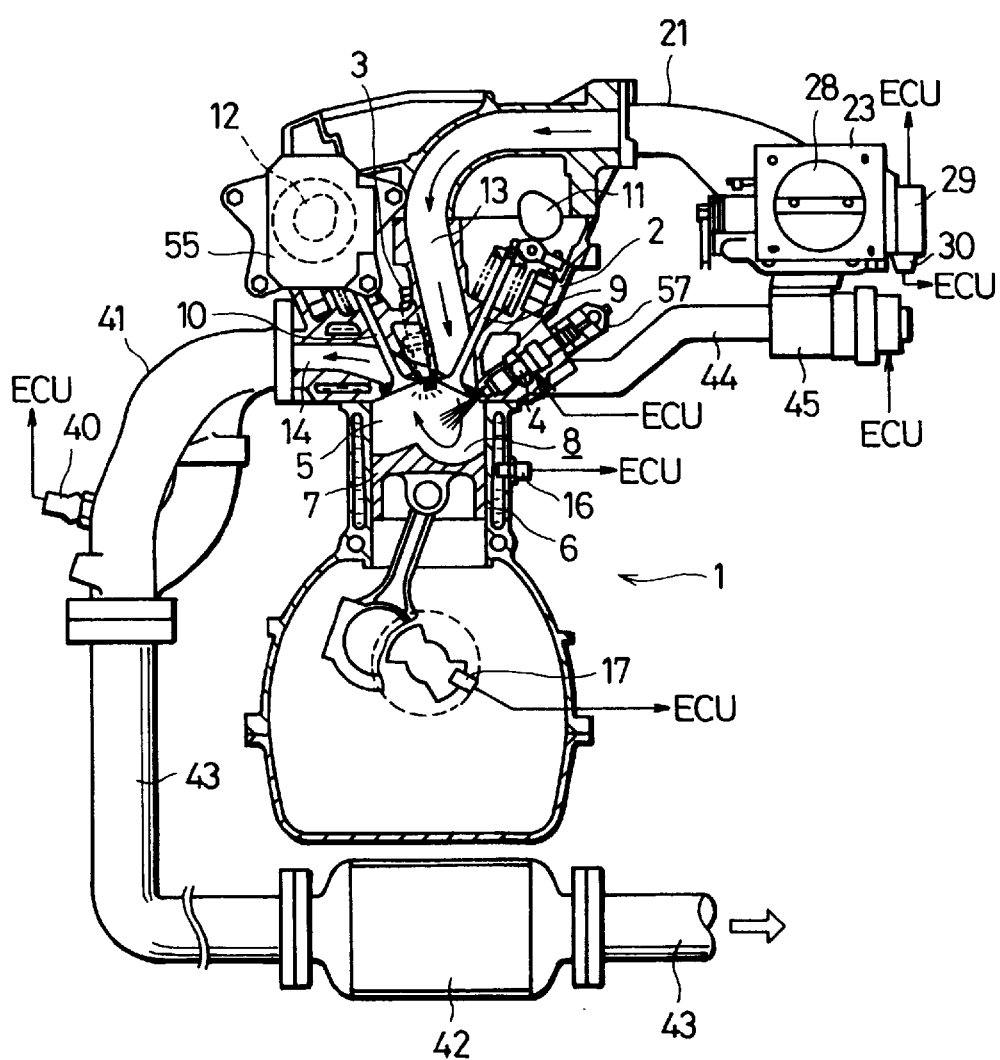
FIG. 1 is a longitudinal sectional view of an in-cylinder injection gasoline engine to which a cylinder head according to the present invention is mounted.
Figure 2:
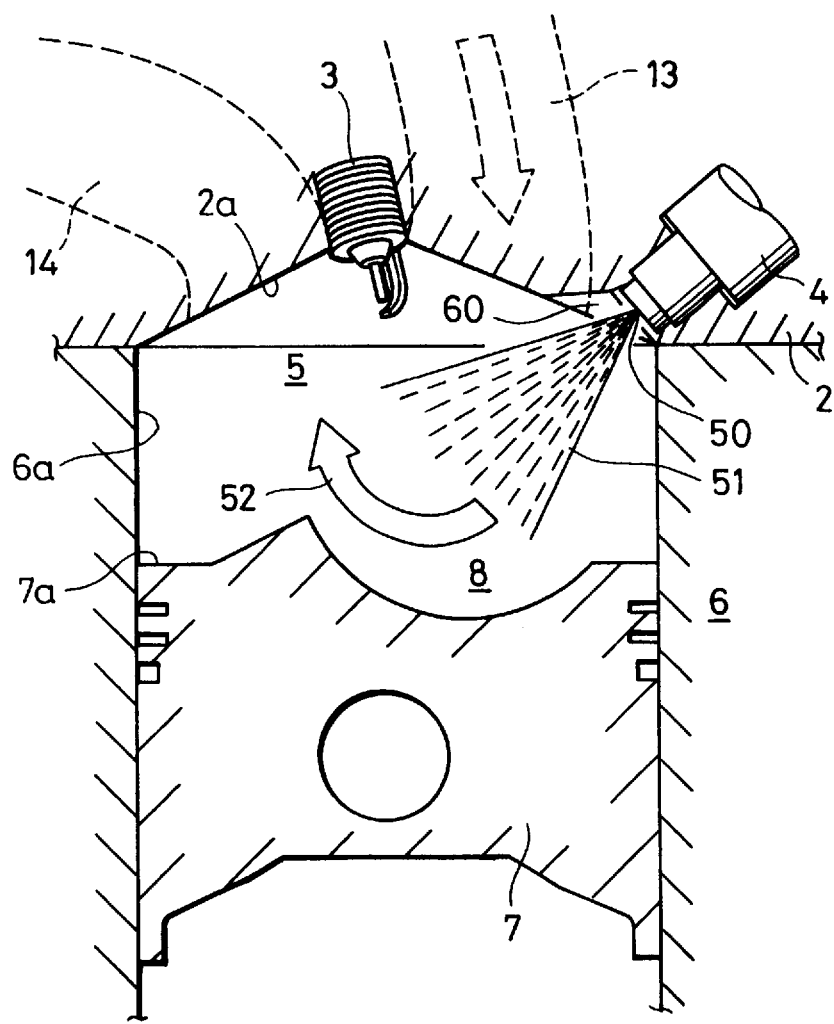
FIG. 2 is a longitudinal sectional view of the cylinder head shown in FIG. 1 and the peripheral elements thereof.

In FIGS. 1 and 2, reference numeral 1 denotes an in-line four-cylinder engine body (hereinafter referred simply to as an engine) provided with a combustion chamber, intake device, EGR device, etc. which are designed exclusively for in-cylinder injection. The engine 1 has a cylinder block containing four cylinders 6, cylinder head 2 joined to the upper end face of the cylinder block, and pistons 7 each of which is slidably fitted in the associated cylinder 6. The combustion chamber 5 has, for example, a pent roof shape, which is defined by the bottom face 2a of the cylinder head 2, the inner peripheral surface 6a of the cylinder 6, and the top face 7a of the piston 7.

The cylinder head 2 of the engine 1 is provided with an electromagnetic fuel injection valve 4 as well as an ignition plug 3 for each cylinder so that fuel is directly injected from the injection valve 4 into the combustion chamber 5. On the top face 7a of the piston 7, a semi-spherical cavity 8 is formed at a position which fuel spray 51 injected from the fuel injection valve 4 reaches when fuel is injected at the later stage of the compression stroke. The theoretical compression ratio of this engine 1 is set at a higher value (about 12 in this embodiment) than that of the manifold-injection gasoline engine. The valve operating mechanism is of a DOHC four-valve type. At the upper part of the cylinder head 2, an intake-side camshaft 11 and an exhaust-side camshaft 12 are rotatably supported to drive intake valves 9 and exhaust valves 10, respectively.

The cylinder head 2 is formed with an upright type intake port 13 which passes through between the camshafts 11 and 12.

The intake port 13 has an intake opening 13a (FIG. 3) on the bottom face 2a of the cylinder head 2 at a position on one side of an imaginary plane (FIG. 3) in which the axis of the cylinder 6 is included, so that the intake air flow passing the intake opening 13a produces a reverse tumble flow 52 in the associated combustion chamber 5. An exhaust port 14 is formed substantially in the horizontal direction as in the ordinary engine, and a large-diameter EGR port (not shown) branches from the exhaust port 14 and extends downward obliquely. In FIG. 1, reference numeral 16 denotes a water temperature sensor for detecting the cooling water temperature $T_W$, and 17 denotes a vane-type crank angle sensor for outputting the crank angle signal SGT.

An intake pipe (not shown) having a throttle body 23 etc. is connected to the intake port 13 via an intake manifold 21. The throttle body 23 has a butterfly-type throttle valve 28 for opening/closing the intake air passage, a throttle sensor 29 for detecting the opening degree $\theta_{TH}$ of the throttle valve 28, and an idle switch 30 for detecting the full-close state of the throttle valve 28. On the other hand, an exhaust pipe 43 having a three way catalyst 42, a muffler (not shown), etc. is connected to the exhaust port 14 via an exhaust manifold 41 which is provided with an $O_2$ sensor for detecting the oxygen concentration in the exhaust gas. Also, the EGR port is connected to the upstream-side portion of the intake manifold 21 via a large-diameter EGR pipe 44 which is provided with a stepper motor type EGR valve 45. In the figure, reference numeral 46 denotes a high-pressure fuel pump which is driven by the exhaust-side camshaft 12 and which delivers a discharge pressure of 50 to 60 kg/cm$^2$ or higher even at the time of idling operation of the engine 1.

Figure 3:
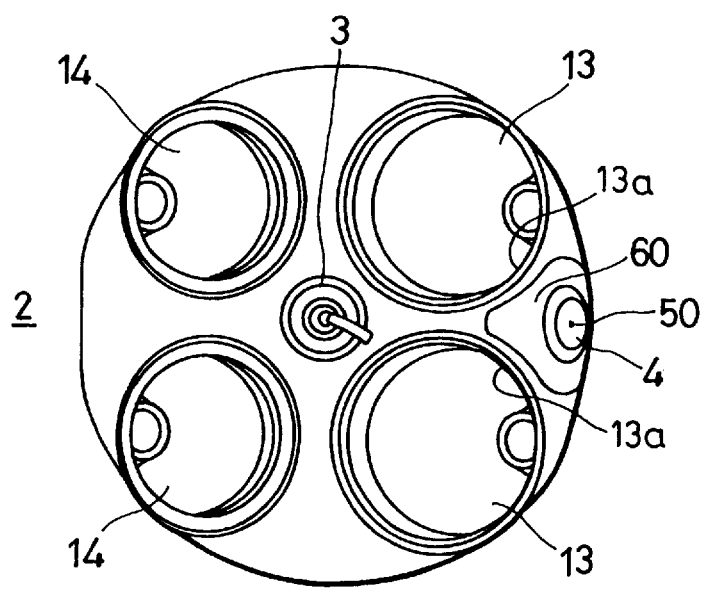
FIG. 3 is a bottom view of the cylinder head to which an ignition plug and a fuel injection valve are mounted.
Figure 4:
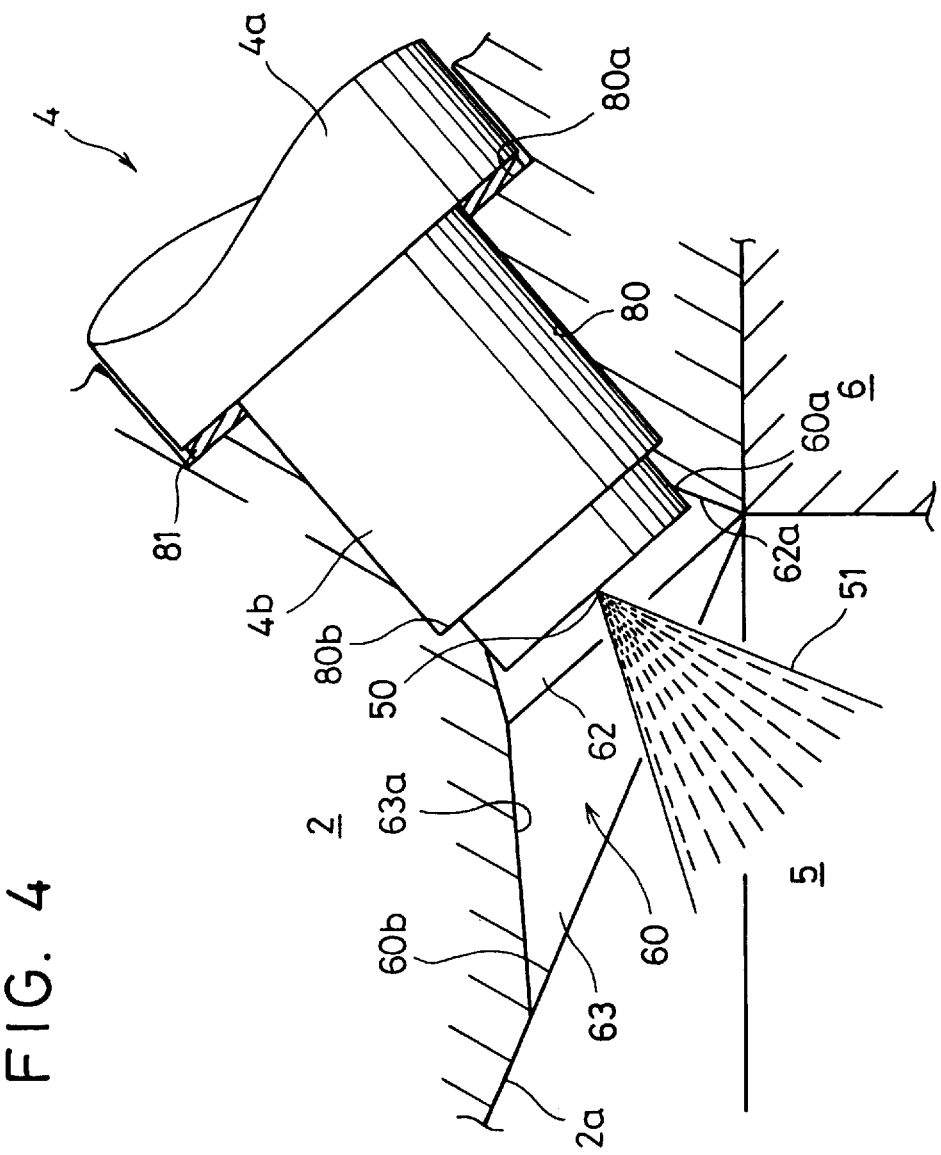
FIG. 4 is an enlarged partial sectional view showing a part of cylinder head to which the fuel injection valve is mounted.

Next, the cylinder head 2 and the peripheral elements thereof will be further described with reference to FIGS. 2 to 4.

The cylinder head 2 is formed with an injection valve mounting hole 80, in which the fuel injection valve 4 is mounted, at a position offset in the radial direction from the center of the cylinder head. The injection valve mounting hole 80 extends obliquely with respect to the axis of the cylinder 6. The injection valve mounting hole 80 has a large-diameter portion accommodating a main body 4a of the fuel injection valve 4, a medium-diameter portion accommodating a major part of a nozzle section 4b, and a small-diameter portion accommodating a tip end portion of the nozzle section 4b. A seal seating face 80a, on which the tip end face of the fuel injection valve main body 4a abuts, is formed at a stepped portion between the large-diameter portion and the medium-diameter portion of the injection valve mounting hole 80. A seating face 80b, which faces the tip end face of an intermediate stepped portion of the fuel injection valve nozzle 4b, is formed at a stepped portion between the medium-diameter portion and the small-diameter portion of the injection valve mounting hole 80. A seal washer 81 is disposed between the seal seating face 80a of the injection valve mounting hole 80 and the tip end face of the injection valve main body 4a so as to prevent fuel and high-pressure gas from leaking through the gap between the fuel injection valve 4 and the injection valve mounting hole 80.

The cylinder head 2 is formed with an injection passage 60 (FIG. 4) to provide communication between the fuel injection valve 4 and the combustion chamber 5 and to prevent turbulence of fuel spray 51 injected from the injection port 50 of the fuel injection valve 4. The injection passage 60 extends in the same direction as the injection valve mounting hole 80. The injection passage 60 communicates with the injection valve mounting hole 80 at the end (first end) 60a thereof located on the injection valve mounting hole side, and opens to the bottom face 2a of the cylinder head 2 at the end (second end) 60b thereof located on the combustion chamber side. As shown in FIG. 3, the opening 60b of the injection passage 60 is provided between the intake openings 13a of two intake ports 13 adjoining the opening 60b. The external edge of the opening 60b of the injection passage 60 extends along the external edge of the two intake openings 13a.

The injection passage 60 of this embodiment is formed to have the cross sectional area which increases gradually from the injection port 50 side of the fuel injection valve 4 toward the combustion chamber 5 side. Specifically, the injection passage 60 includes a first passage section 62 and a second passage section 63 (FIG. 4). The cross sectional area increase rates of these sections 62, 63 are different from each other.

The inner face 62a of the first passage section 62 adjacent to the injection valve mounting hole 80 is formed by cutting work into a tapered seal seating face 62a which preferably defines a space of a truncated cone shape. The inner face 63a of the second passage section 63 adjacent to the combustion chamber 50 is formed into a tapered shape such as to preferably define a space corresponding to an obliquely cut truncated cone. Each of the inner faces 62a and 63a of the passage sections preferably constitutes a part of conical surface. The cross sectional area increase rate at the first passage section 62 is set lower than that at the second passage section (cross sectional area suddenly increasing portion) 63. In other words, when each of the inner faces 62a and 63a of the passage sections constitutes a part of conical surface, the apex angle of cone defined by an imaginary extension of inner face 62a of the first passage section is smaller than the apex angle of cone defined by an imaginary extension of the inner face 63a of the second passage section. The inner faces of the injection passage 60 except the seal seating face 62 is not machined (remained as casted).

The following is a description of the operation of the cylinder head 2 of this embodiment, and the pressure leak test thereof and the fuel leak test of the fuel system.

When the fuel injection valve 4 is activated at a predetermined timing, the fuel spray 51 injected from the injection port 50 of the fuel injection valve 4 first flows into the first passage section 62 having a relatively low cross sectional area increase rate, and then flows into the combustion chamber 5 after passing through the cross-sectional-area-suddenly-increasing portion (second passage section) 63 having a relatively high cross sectional area increase rate. Therefore, the fuel spray 51 flows into a larger space gradually, so that the turbulence caused by sudden divergent flow (separated flow) is eliminated. As a result, incomplete combustion etc. of fuel are less prone to occur, so that an increase in emission of noxious exhaust gas components, decrease in fuel efficiency, and so on, which are problems with the conventional apparatus, are suppressed. Moreover, the gas flow in the cylinder such as the reverse tumble 52 is not hindered, whereby a decrease in fuel efficiency or the like is prevented.

Figure 5:
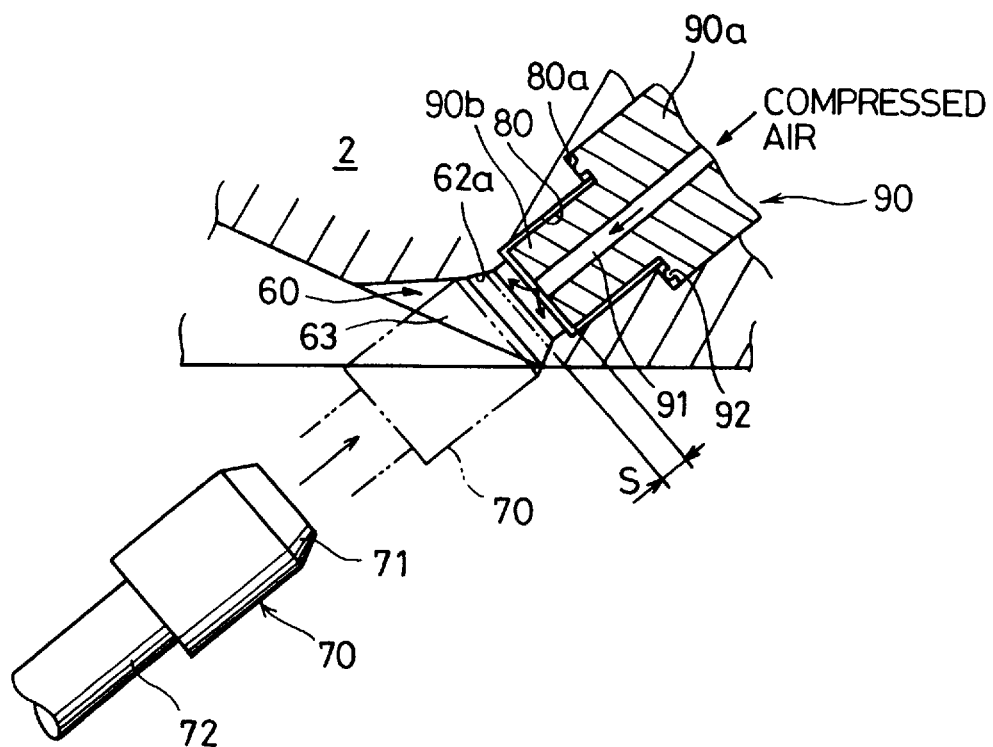
FIG. 5 is a view for illustrating a sealing procedure in a pressure leak test of the cylinder head shown in FIG. 2.

The pressure leak in the cylinder head 2 of this embodiment is tested by using a dummy injection valve 90 and a seal jig 70, as shown in FIG. 5.

The dummy injection valve 90, which is made of urethane rubber, includes a first half 90a corresponding to the main body 4a (FIG. 4) of the fuel injection valve 4 and a second half 90b corresponding to a major part of the nozzle section 4b of the injection valve 4 (except the tip end portion of the nozzle section). The first half 90a of the dummy injection valve 90 has an outside diameter approximately equal to or slightly smaller than the diameter of the large-diameter portion of the injection valve mounting hole 80, and the second half 90b thereof has an outside diameter slightly smaller than the diameter of the small-diameter portion of the injection valve mounting hole 80. The dummy injection valve 90 is formed with an air introducing hole 91 along the axis thereof, and further has a seal portion 92 at the tip end face of the first half 90a.

The seal jig 70, which is a cylinder made of urethane rubber, has at its tip end portion a tapered seal face 71. The seal face 71 is adapted to the seal seating face 62a of the injection passage 60.

The pressure leak of the cylinder head 2 is tested by the following procedure.

After the cylinder head 2 is set to a pressure leak testing equipment (not shown), the dummy injection valve 90 is first inserted and fixed to the injection valve mounting hole 80 as shown in FIG. 5. Next, the seal jig 70 is mounted to a rod 72 of an actuator (for example, an air cylinder), and the seal face 71 of the seal jig 70 is pressed against the seal seating face 62a of the injection passage 60 by operating the rod 72 in the direction indicated by the arrow in FIG. 5. As a result, the seal jig 70 is positioned away from the dummy injection valve 90 by a distance S, as indicated by the two-dot chain line in FIG. 5.

Compressed air from a compressed air source, not shown, is introduced into a space defined by the tip end face of the seal jig 70, the tip end face of the dummy injection valve 90, and the inner peripheral surface of the injection valve mounting hole 80, through the air introducing hole 91 formed in the dummy injection valve 90. The compressed air introduced into this space flows in between the inner peripheral surface of the injection valve mounting hole 80 and the outer peripheral surface of the second half of the dummy injection valve 90. By the seal portion 92 of the dummy injection valve 90, leaks of compressed air through the gap between the inner peripheral surface of the injection valve mounting hole 80 and the outer peripheral surface of the first half of the dummy injection valve 90 are prevented. Since the seal surface 71 of the seal jig 70 is in airtight contact with the seal seating face 62a of the injection passage 60, the compressed air does not leak from between the inner peripheral surface of the injection passage 60 and the outer peripheral surface of the seal jig 70. Even if the axis of the seal jig 70 slightly deviates from the axis of the injection passage 60, the seal jig 70 is elastically deformed so as to accommodate this deviation, whereby airtightness required in the pressure leak test is maintained sufficiently. As a result, the space defined by the tip end face of the seal jig 70, the outer face of the dummy injection valve 90, and the inner peripheral surface of the injection valve mounting hole 80 between the seal seating face 62 of the injection passage 60 and the seal seating face 80a of the injection valve mounting hole 80 is filled with compressed air. If a minute crack or shrinkage cavity is present on the cylinder head 2 around the injection valve mounting hole 80, the compressed air leaks from the aforementioned space, so that the air pressure decreases.

Therefore, the air pressure is measured after a predetermined time has elapsed from the time of completion of compressed air introduction. If the measurement result is lower than a predetermined value, it is judged that "a leak is present". If not, it is judged that "a leak is absent".

Figure 6:
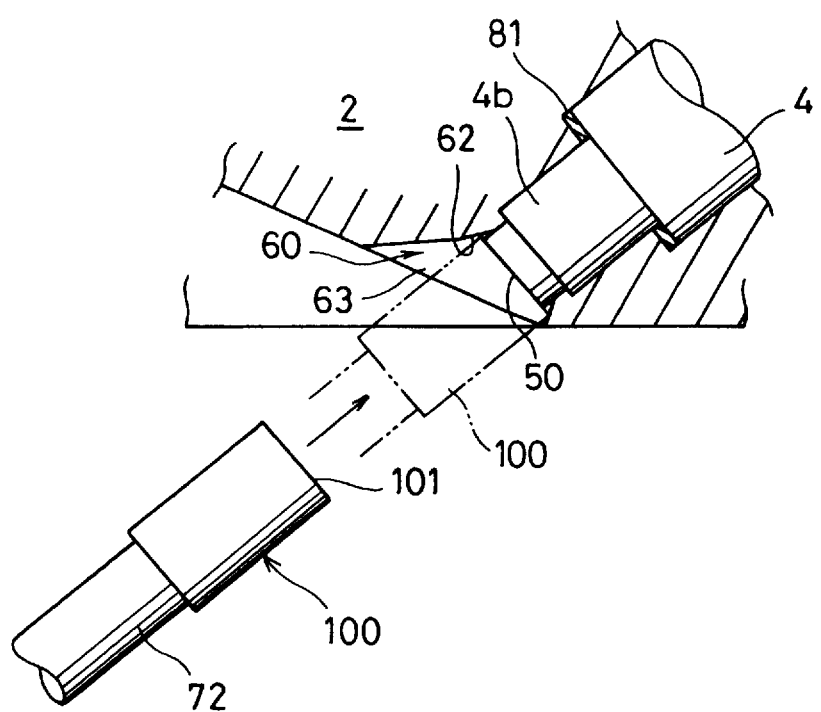
FIG. 6 is a view for illustrating a sealing procedure in a leak test of a fuel system including the fuel injection valve mounted in the cylinder head shown in FIG. 2.

In this embodiment, the leak in fuel system is tested by the following procedure. After the cylinder head 2, to which the fuel injection valve 4, a high-pressure fuel pump 46, a fuel piping, etc. are mounted, is set to a leak testing machine (not shown), a seal jig 100 is pressed against the tip end of the fuel injection valve 4 as shown in FIG. 6, and the amount of fuel leak from parts of the fuel system is detected while applying a predetermined fuel pressure to the fuel system.

The seal jig 100 is a urethane rubber cylinder formed at its tip end with a seal face 101. The seal face 101 has a diameter slightly larger than the diameter of the tip end face of the nozzle section 4b of the fuel injection valve 4 and approximately equal to or slightly smaller than the average inside diameter of the first passage section 62 of the injection passage 60. The seal jig 100 moves in the direction indicated by the arrow while being held by a rod 72 of actuator. When the seal jig 100 is pressed against the fuel injection valve 4, the seal face 101 abuts on the tip end face of the fuel injection valve 4, so that fuel leaks from the injection port 50 are prevented. At this time, even if the axis of the seal jig 100 slightly deviates from the axis of the injection passage, the seal jig 100 is elastically deformed so that the seal face 101 comes in contact with the tip end face of the fuel injection valve 4, whereby liquid-tightness required in the fuel leak test is maintained sufficiently.

As described above, the cylinder head 2 of this embodiment has the injection passage 60 which provides communication between the injection port 50 of the fuel injection valve 4 and the combustion chamber 5 and whose cross sectional area increases from the injection port 50 side toward the combustion chamber 5 side, and adapted to form the seal seating face 62a on the inner face of the injection passage 60 on the injection port 50 side. Therefore, an increase in emission of noxious exhaust gas components, decrease in fuel efficiency, and so on, which are caused by the turbulence of fuel spray 51, can be suppressed, and the adverse effect of compressed air leaks from the injection valve mounting hole 80 and from the injection passage 60 in the pressure leak test of the cylinder head 2 and the adverse effect of fuel leaks from the fuel injection valve 4 in the leak test of fuel system can be prevented.

Figure 7:
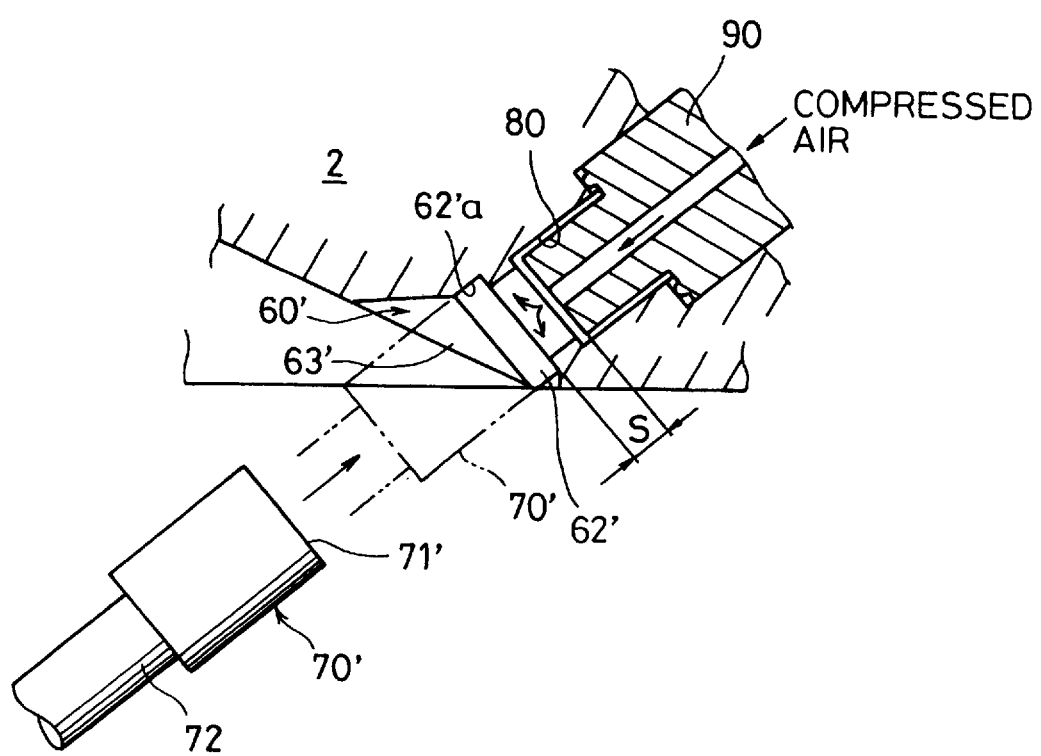
FIG. 7 is a view for illustrating a sealing procedure in a pressure leak test of a cylinder head according to a modification of the present invention.
Figure 8:
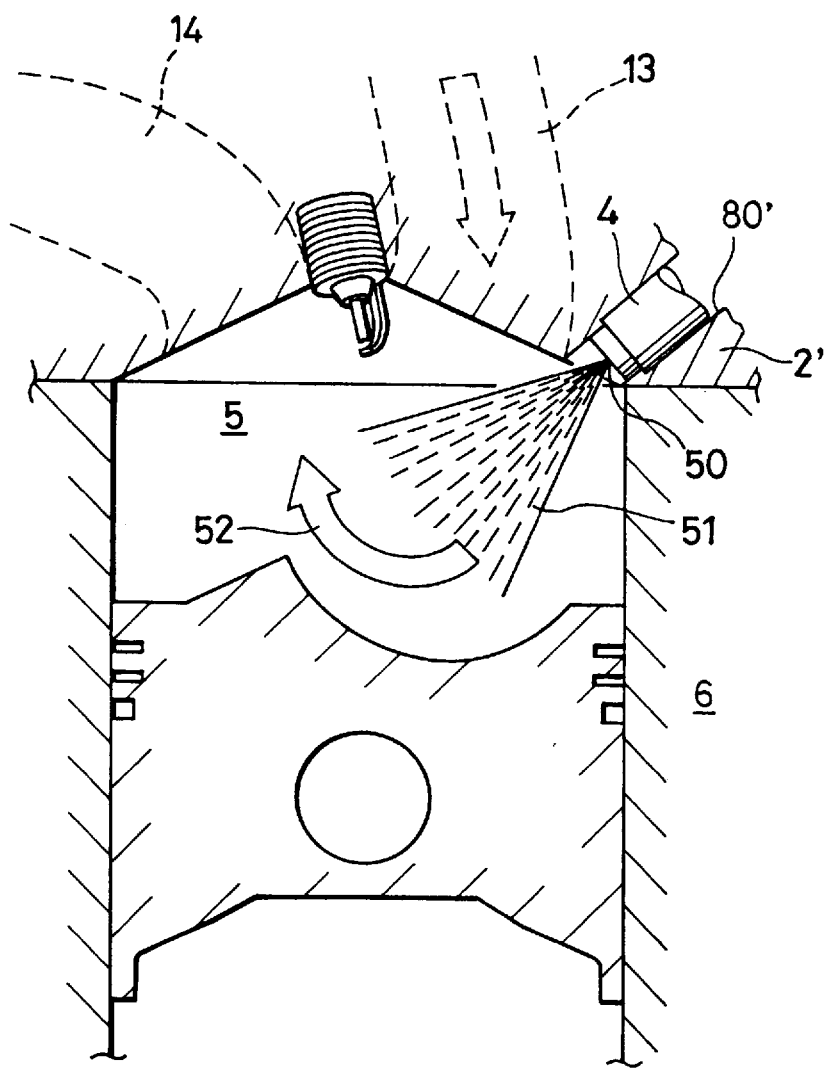
FIG. 8 is a longitudinal sectional view of a conventional cylinder head and the peripheral elements thereof.

In the above, the explanation solely for one preferred embodiment of the present invention has been given. The present invention is not limited to the above-described embodiment. For example, in the embodiment, the present invention is applied to in-line four-cylinder in-cylinder injection gasoline engines, but it may be applied to engines having different number of cylinders or different cylinder arrangement, such as single-cylinder engines and V-type six-cylinder engines, or may be applied to engines using fuel other than gasoline such as methanol. Also, in the embodiment, the tapered seal seating face is formed on the inner face of the injection passage on the fuel injection valve side, but, as shown in FIG. 7, a seal seating face 62'a consisting of, for example, a right circular cylindrical surface may be formed on the end face of an injection passage 60' on the fuel injection valve 4 side. In this case, a seal jig 70' having a tip end formed into a shape (for example, a right circular cylindrical shape) complementary to the seal seating face 62'a is used in the pressure leak test. In FIG. 7, reference numerals 62', 63', and 71' denote the elements corresponding to the aforementioned elements 62, 63, and 71, respectively.

The injection passage 60 of the present invention may be of any type, provided that the cross sectional area of the injection passage 60 of the present invention at the end (first end) on the fuel injection valve side is equal to or larger than that of the injection valve mounting hole at the portion adjacent to the first end, and the cross sectional area thereof at the end (second end) on the combustion chamber side is larger than that at the first end. The injection passage may have a passage region in which the cross sectional area is kept constant toward the downstream side as in the modification shown in FIG. 7, but it is undesirable for the cross sectional area to decrease. Although the injection passages 60, 60' of the above-described embodiment and modification each consist of two passage sections, the injection passage may be configured by three or more passage sections having a different increasing rate of change in cross sectional area. Alternatively, the injection passage may be configured by one passage section having its cross sectional area which continuously increasingly changes.

Further, the specific configuration of the apparatus, the shape of the injection passage, etc. may be modified without departing from the spirit and scope of the present invention.

What is claimed is:

1. A cylinder head for an in-cylinder injection spark-ignition type internal combustion engine, comprising:
    a combustion chamber defined by an inner surface of a cylinder, a top face of a piston slidably disposed in said cylinder, and a bottom face of said cylinder head, said combustion chamber having a pent-roof shape formed by the top surface of said piston and the bottom face of said cylinder;
    an intake port connected to two intake openings, which open on the bottom face of said cylinder head, said intake port providing a downward flow of intake air to said combustion chamber to form a vertical tumbling flow of air, enhanced by the pent-roof shape of said combustion chamber, within said combustion chamber;
    an injection valve mounting hole which mounts a fuel injection valve, said injection valve mounting hole being provided at an outer periphery of said combustion chamber;
    an ignition device mounting hole which mounts an ignition device substantially adjacent to an upper central portion of said combustion chamber; and
    an injection passage having a first end and a second end, said first end connected to said injection valve mounting hole and said second end connected to a peripheral portion of said combustion chamber and between said two intake openings, a cross sectional area of said injection passage on a side of said first end being equal to or larger than a cross sectional area of said injection valve mounting hole at a portion adjacent to said injection passage, and a cross sectional area of said injection passage on a side of said second end being larger than the cross sectional area at the side of said first end, such that when fuel is injected by the fuel injection valve, said injection passage prevents an upper surface of said combustion chamber from disturbing the flow of fuel injected towards an imaginary plane, which includes a central axis of the cylinder, in a diagonally downward direction.

2. The cylinder head according to claim 1, wherein said cross sectional area of said injection passage increases from the side of the first end toward the side of the second end.

3. The cylinder head according to claim 1, wherein a change rate of the cross sectional area on the side of the first end is smaller than a change rate of the cross sectional area on the side of the second end.

4. The cylinder head according to claim 3, wherein said injection passage includes a first passage section disposed on the side of the first end and a second passage section disposed on the side of the second end, said first passage section having a cross sectional area which decreases toward the first end, said second passage section having a cross sectional area which increases toward the second end, and wherein a tapered seal seating face is formed on an inner face of said first passage section.

5. The cylinder head according to claim 1, wherein said injection passage has an inner face thereof formed with a seal seating face, on the side of the first end.

6. The cylinder head according to claim 5, wherein said seal seating face is formed into a tapered shape.

7. The cylinder head according to claim 1, wherein said intake port being upright and extends from said two intake openings, said two intake openings being on one side with respect to the imaginary plane, and said second end of said injection passage being adjacent to said two intake openings.

8. A cylinder head for an in-cylinder injection spark-ignition type internal combustion engine, said engine including a combustion chamber defined by an inner surface of a cylinder, a top face of a piston slidably disposed in the cylinder, and a bottom face of the cylinder head, said cylinder head comprising:
    a fuel injection valve disposed in the cylinder head for directly injecting fuel into the combustion chamber; and
    an ignition device for igniting the fuel injected into the combustion chamber,
    wherein said cylinder head includes an injection valve mounting hole to which said fuel injection valve is mounted, and an injection passage communicating, at a first end thereof disposed on a side of the fuel injection valve, with said injection valve mounting hole and opening, at a second end thereof disposed on a side of the combustion chamber, to said bottom face of said cylinder head, said injection passage includes a first passage section disposed on the side of the first end and a second passage section disposed in the side of the second end, said first passage section having a constant cross sectional area over an entire length thereof, said second passage section having a cross sectional area which increases toward the second end, and wherein a seal seating face is formed on an inner face of said first passage,
    wherein a cross sectional area of said injection passage on a side of said first end being equal to or larger than a cross sectional area of said injection valve mounting hole at a portion adjacent to said injection passage and a cross sectional area of said injection passage on a side of said second end thereof is larger than the cross sectional area thereof on the side of said first end.

9. The method of testing a pressure leak of a cylinder head, comprising:
    providing an injection valve mounting hole for mounting a fuel injection valve therein, said injection valve mounting hole having a smaller diameter portion at a side closer to a combustion chamber, a larger diameter portion at a side away from the combustion chamber, and a seal portion between the smaller diameter portion and the larger diameter portion;
    providing an injection passage in a cylinder head having a first end connected to the fuel injection mounting hole and a second end connected to the combustion chamber, said injection passage including a first passage section disposed on the side of the first end and a second passage section disposed on the side of the second end, said first passage section having a first tapered seal seating face at an inner face thereof;

inserting a dummy injection valve into said injection valve mounting hole, said dummy injection valve including a first half having a diameter substantially the same as the larger diameter portion, a second half having a diameter smaller than the smaller diameter portion, and an air introducing hole for ejecting compressed air from an end portion of said second half, an end portion of said larger first half seating against said seal portion;

placing a seal jig having a tapered seal face against said second tapered seal face to created a space confined by said seal jig, said second half, said smaller diameter portion, and said seal portion;

applying compressed air into said confined space; and measuring pressure change inside said confined space.

10. The method of testing a fuel leak in a fuel system, comprising:

providing an injection valve mounting hole for mounting a fuel injection valve therein;

providing an injection passage in a cylinder head having a first end connected to the fuel injection mounting hole and a second end connected to a combustion chamber, said injection passage including a first passage section, having a first diameter, disposed on the side of the first end and a second passage section disposed on the side of the second end;

inserting a fuel injection valve into said injection valve mounting hole, said fuel injection valve including an injection port at an end portion thereof having a second diameter smaller than said first diameter;

placing a seal jig having a third diameter to seal said injection port, said third diameter being larger than the second diameter and smaller than the first diameter; and measuring leak in the fuel system.

\* \* \* \* \*